US009781599B2

(12) United States Patent
Myers et al.

(10) Patent No.: US 9,781,599 B2
(45) Date of Patent: Oct. 3, 2017

(54) SYSTEM AND METHOD FOR ACCESS CONTROL VIA MOBILE DEVICE

(75) Inventors: Gary L. Myers, Monee, IL (US); Ashok Hirpara, Carol Stream, IL (US); John D. Veleris, Northbrook, IL (US); Arkadiusz Zimny, South Elgin, IL (US); Michael Aaron Cohen, Buffalo Grove, IL (US); Eugene Nakshin, Round Lake, IL (US)

(73) Assignee: Delphian Systems, LLC, Buffalo Grove, IL (US)

( * ) Notice: Subject to any disclaimer, the term of this patent is extended or adjusted under 35 U.S.C. 154(b) by 509 days.

(21) Appl. No.: 13/978,214

(22) PCT Filed: Jan. 9, 2012

(86) PCT No.: PCT/US2012/020632
§ 371 (c)(1),
(2), (4) Date: Aug. 7, 2013

(87) PCT Pub. No.: WO2012/094667
PCT Pub. Date: Jul. 12, 2012

(65) Prior Publication Data
US 2013/0326595 A1 Dec. 5, 2013

Related U.S. Application Data

(60) Provisional application No. 61/430,621, filed on Jan. 7, 2011, provisional application No. 61/584,043, filed on Jan. 6, 2012.

(51) Int. Cl.
*H04W 12/08* (2009.01)
*H04L 29/06* (2006.01)
*G07C 9/00* (2006.01)

(52) U.S. Cl.
CPC ........ *H04W 12/08* (2013.01); *G07C 9/00174* (2013.01); *G07C 9/00309* (2013.01); *G07C 9/00571* (2013.01); *H04L 63/10* (2013.01)

(58) Field of Classification Search
CPC .............. H04W 12/08; G07C 9/00571; G07C 9/00174; G07C 9/00309; H04L 63/10
See application file for complete search history.

(56) References Cited

U.S. PATENT DOCUMENTS

| 6,927,684 B2 | 8/2005 | Joyner et al. |
| 6,950,944 B2 | 9/2005 | Yager et al. |

(Continued)

FOREIGN PATENT DOCUMENTS

| CA | 2481912 A1 * | 9/2005 |
| CN | 101260755 A | 9/2008 |

(Continued)

OTHER PUBLICATIONS

Taiwanese Intellectual Propety Office/Patent Office, Examination Report and Search Report in corresponding Taiwanese Application No. 101100756 dated Aug. 11, 2015.

(Continued)

*Primary Examiner* — Michael Pyzocha
(74) *Attorney, Agent, or Firm* — Leydig, Voit & Mayer, Ltd.

(57) ABSTRACT

A system is described for controlling an actuating unit that restricts physical access such as a motorized garage door actuator unit. The system comprises a mobile wireless communication device, an electro-mechanical access control security device, and a receiving unit controlling the electro-mechanical access control security device, the receiving unit paired with the mobile wireless communication device for receiving user input for activating the electro-mechanical access control security device via a peer-to-peer (Continued)

communication directly with the mobile wireless communication device, and a pre-authorization of communication of the receiving unit with the mobile wireless communication device, the mobile wireless communication device receiving the pre-authorization from a central security server.

15 Claims, 3 Drawing Sheets

(56) References Cited

U.S. PATENT DOCUMENTS

| | | | |
|---|---|---|---|
| 7,209,029 B2* | 4/2007 | Coelho | G06Q 10/02 340/4.62 |
| 7,315,823 B2 | 1/2008 | Bröndrup | |
| 7,647,041 B2 | 1/2010 | Gonsalves et al. | |
| 8,508,332 B2* | 8/2013 | Jones | G07C 9/00309 307/326 |
| 2002/0031228 A1 | 3/2002 | Karkas et al. | |
| 2003/0006879 A1* | 1/2003 | Kang | G07C 9/00309 340/5.61 |
| 2003/0186652 A1* | 10/2003 | Hopf | B60R 16/023 455/41.2 |
| 2003/0194089 A1* | 10/2003 | Kansala | G07C 9/00166 380/270 |
| 2003/0228879 A1 | 12/2003 | Witkowski et al. | |
| 2004/0048622 A1 | 3/2004 | Witkowskie et al. | |
| 2005/0014468 A1* | 1/2005 | Salokannel | G06K 7/0008 455/41.2 |
| 2005/0037787 A1 | 2/2005 | Bachner, III et al. | |
| 2005/0076242 A1* | 4/2005 | Breuer | H04W 12/08 726/4 |
| 2006/0072755 A1* | 4/2006 | Oskari | G06F 21/35 380/270 |
| 2007/0176739 A1* | 8/2007 | Raheman | H04W 12/04 340/5.64 |
| 2007/0197261 A1* | 8/2007 | Humbel | G06Q 30/00 455/558 |
| 2008/0147268 A1* | 6/2008 | Fuller | B60R 25/24 701/33.4 |
| 2008/0238610 A1* | 10/2008 | Rosenberg | G06Q 20/20 340/5.7 |
| 2008/0249847 A1 | 10/2008 | Dahlin | |
| 2009/0027194 A1* | 1/2009 | McGrath | E05B 45/06 340/540 |
| 2009/0066476 A1* | 3/2009 | Raheman | G07C 9/00103 340/5.64 |
| 2009/0156126 A1 | 6/2009 | Willis | |
| 2009/0163140 A1* | 6/2009 | Packham | H04L 67/02 455/41.2 |
| 2009/0170539 A1* | 7/2009 | Kortge | H04L 63/1441 455/466 |
| 2009/0237206 A1 | 9/2009 | Anderson | |
| 2010/0061294 A1 | 3/2010 | Proctor, Jr. et al. | |
| 2010/0201482 A1* | 8/2010 | Robertson | G07C 9/00111 340/5.61 |
| 2010/0237989 A1* | 9/2010 | Ikegami | G06Q 10/087 340/5.61 |
| 2010/0241857 A1* | 9/2010 | Okude | B60R 25/24 713/168 |
| 2010/0293611 A1* | 11/2010 | Ablabutyan | B60P 1/4471 726/17 |

FOREIGN PATENT DOCUMENTS

| | | |
|---|---|---|
| CN | 201176745 Y | 1/2009 |
| CN | 101661639 A | 3/2010 |
| CN | 201562306 U | 8/2010 |
| CN | 201667086 U | 12/2010 |
| DE | 202007007611.8 | 10/2008 |
| WO | WO 01/63425 A1 | 8/2001 |
| WO | WO 2006/136662 A1 | 12/2006 |

OTHER PUBLICATIONS

State Intellectual Property Office of the People's Republic of China, First Office Action and Search Report in corresponding Chinese Application No. 201280010958.8 dated May 26, 2015.
Bluetooth Special Interest Group, "Bluetooth Specification Version 2.1 + EDR [vol. 2]," Chapter 7 Secure Simple Pairing, *Bluetooth SIG, Inc.*, pp. 888-906, Jul. 26, 2007.
International Bureau of WIPO, International Preliminary Report on Patentability mailed in cognate PCT International Application No. PCT/US2012/020632 on Jul. 18, 2013.
International Searching Authority, International Search Report and Written Opinion mailed in cognate PCT International Application No. PCT/US2012/020632 on Apr. 27, 2012.

\* cited by examiner

FIG. 1

SYSTEM AND METHOD FOR ACCESS CONTROL VIA MOBILE DEVICE

CROSS-REFERENCE TO RELATED APPLICATIONS

This application is related to, and claims priority from, U.S. Provisional Application No. 61/430,621 filed on Jan. 7, 2011, and entitled "System and Method for Access Control Via Mobile Device," which is incorporated by reference herein in its entirety, including any references contained therein.

This application is related to, and claims priority from, U.S. Provisional Application No. 61/584,043, filed on Jan. 6, 2012, and entitled "System and Method for Access Control Via Mobile Device," which is incorporated by reference herein in its entirety, including any references contained therein.

This application is related to U.S. application Ser. No. 13/162,334 filed on Jun. 16, 2011, which is a non-provisional of provisional U.S. Application No. 61/355,303 filed Jun. 16, 2010, and entitled "Wireless Device Enabled Locking System," the contents of which are incorporated herein by reference in their entirety for all that they teach.

FIELD OF THE INVENTION

This invention relates generally to the field of security locking devices and access control, and more specifically to electronically activated access control via mobile wireless communication devices with computer application program execution capabilities.

BACKGROUND OF THE INVENTION

Mechanically and/or electro-mechanically operated doors serve an important function in both commercial and residential contexts today ensuring that personnel and/or visitors who are not authorized to access particular premises or secured items are restricted from such access, while providing access to the intended parties. Either an unauthorized access or an unintended refusal of access can have financial consequences and/or cause delay and disruption. Thus, when conditions and/or persons subject to physical access control to premises or restricted items change dynamically, access management becomes an important priority.

It will be appreciated that this background description has been presented to aid the reader in understanding the aspects of the invention, and it is not to be taken as a reference to prior art nor as an indication that any of the indicated problems were themselves appreciated in the art.

BRIEF SUMMARY OF THE INVENTION

Illustrative examples of the invention provide a system for controlling physical access. The system comprises a central security server, a mobile wireless communication device supporting a plurality of wireless communication technologies including: mobile wireless, and short-range wireless. In addition, the system includes an electro-mechanical access control security device (e.g., a garage door actuator). The system also includes a receiving unit controlling the electro-mechanical access control security device, wherein the receiving unit is adapted to be paired with a host on the mobile wireless communication device for receiving user commands for activating the electro-mechanical access control security device via a plurality of modes. The plurality of modes includes a remote mode solely using a peer-to-peer communication directly with the mobile wireless communication device via the short-range wireless communication technology. The plurality of modes further includes a global mode using a pre-authorization, obtained by the host on the mobile wireless communication device from the central security server via the mobile wireless technology, for a user command issued from the mobile wireless communication device to the receiving unit via the short-range wireless communication technology.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
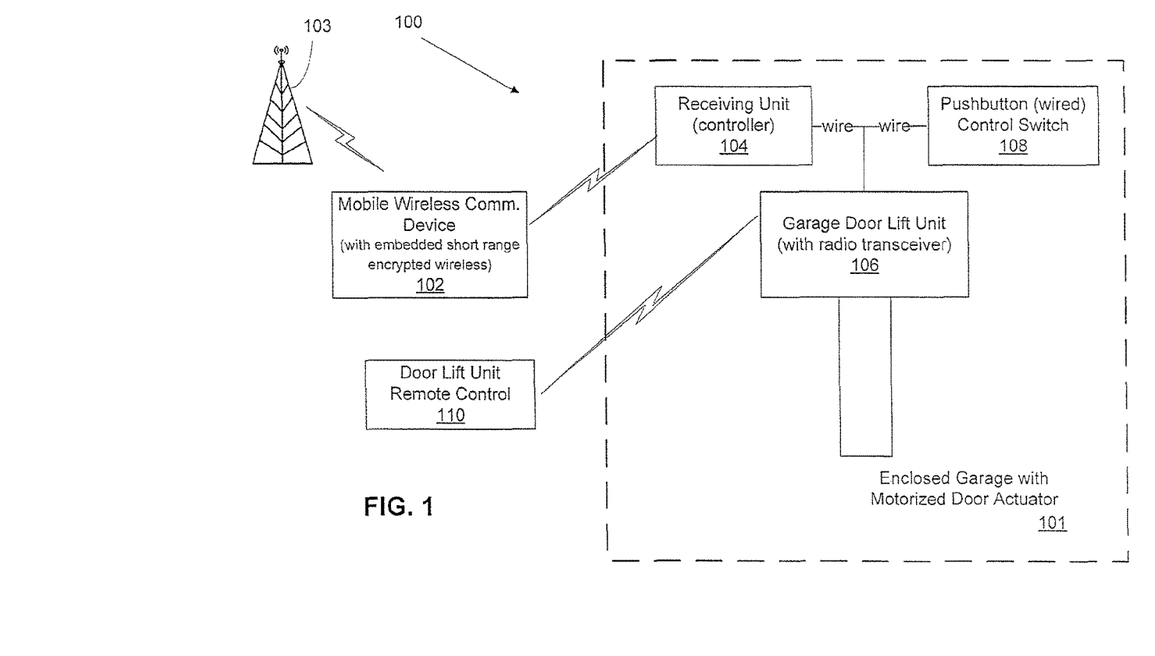
FIG. 1 illustrates a system for controlling an electro-mechanical access control security device, such as a garage door lift (actuator) unit, or alternatively a secure door, such as a commercial safe or vault, via a mobile wireless communication device in accordance with an illustrative example of the invention.

Turning to FIG. 1, an illustrative example of a system 100 is shown that utilizes multiple wireless communication technologies (e.g., protocols, standards) to control operation of electro-mechanical devices associated with, for example, limiting physical access to secure enclosures. Illustrative examples described herein include access control security devices such as electrically actuated locks, garage door openers, electrically actuated gates and/or vehicle or person entry barriers, as well as electrically actuated secure doors, such as those for a commercial safe or vault, gun and/or ammunition safe, gun and/or ammunition cabinet, etc. Further illustrative examples relate to other enclosures, compartments and things to which secure restricted access is desired utilizing the described wirelessly controlled secure (e.g., encrypted) access technology.

The systems and methods described herein include a mobile wireless communication device such as a smart cellular wireless phone, a portable (e.g., tablet) computer, or the like, configured to transmit an actuator control signal via a secure wireless communication (e.g., encrypted Bluetooth) link to a receiver to activate an actuator associated with secure restricted access to a space (e.g., an enclosed garage 101). An illustrative example of the receiver is a receiving unit that triggers an access control actuator using a signal path parallel to an existing physical signal source that also triggers the access control actuator (e.g., a keypad or other previously installed access authentication devices including fingerprint readers, encrypted USB drive authenticators, etc.). The described mobile wireless communication device-based remote activation of a secure access control actuator (also referred to herein as a "Controller") enhances secure access options while maintaining a high level of confidence in the integrity of the security of the system. Alternative illustrative examples also include wireless restricted access control via systems and methods described herein.

In an illustrative example depicted in FIG. 1, the system 100 includes a mobile wireless communication device 102 (e.g., a cell phone). The communication device 102, is also referred to herein as a "Host" when properly configured with a program module to implement communications with a receiving unit 104 in accordance with functionality described herein. The mobile wireless communication device 102 communicates in a mobile wireless network via a cell tower 103. The mobile wireless communication device 102 is capable of accessing a data network via a cellular service provider associated with the cell tower 103. Moreover, the communication device 102 includes embedded encrypted Bluetooth wireless communications technology for transmitting commands from the Host to an access control device (e.g., the receiving unit 104 for transmitting a control signal to a garage door lift unit 106), referred to herein as a "Controller."

Illustrative examples of the system described herein employ both "global" and "remote" wireless control operational modes. Both global and remote operational modes are described herein below with reference to FIG. 1 (remote) and FIGS. 2A and 2B (global). The global mode is characterized by the communication device 102 (Host) accessing a server via the Internet to obtain pre-authorization to issue a command to perform a specified operation (e.g., open a garage door) to the receiving unit 104. Such pre-authorization request is repeated each time a user seeks to issue a command via the communication device 102 to the receiving unit 104. The remote mode is characterized by localized communications between a master user via the communication device 102 and the receiving unit 104 during configuration of an access definition. The access definition specifies a set of authorized users of the receiving unit 104 and scope of permitted access to the command set of the receiving unit 104 by the authorized users on an individual user basis. The user database and associated authorizations are maintained locally by the receiving unit 104. Each of the two operational modes uses a subset of security (e.g., encryption) protocols and communication technologies to ensure secure communications within a personal network over which the mobile wireless communication device 102 and the receiving unit 104 communicate to perform configuration and/or control functions. While the global operational mode requires Internet access by a Host operating on, for example, the mobile wireless communication device 102, the remote operational mode needs only the local PAN connection between the Host and the receiver 104 to carry out configuration and operation of the access control functionality of the receiver 104 for the lift unit 106.

Figure 2A:
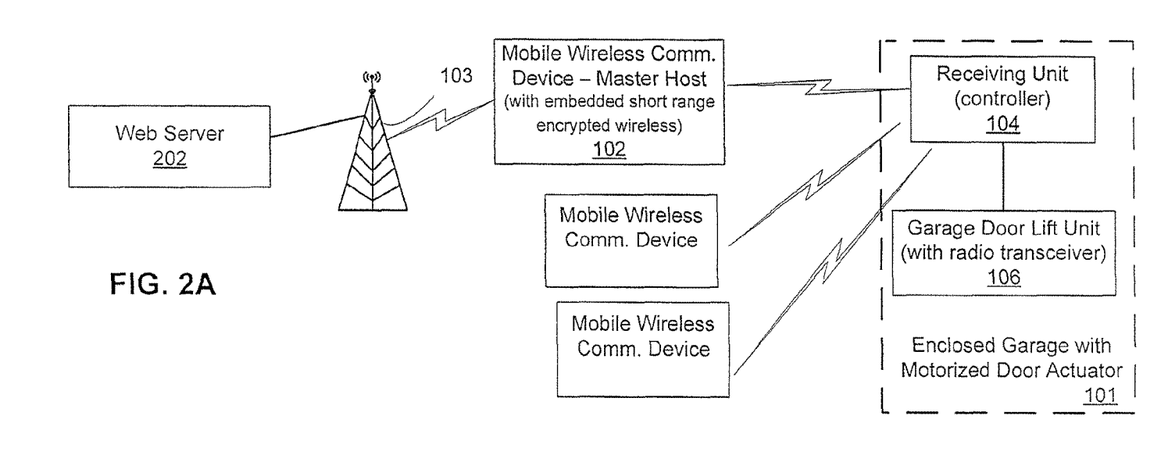
FIG. 2A illustrates another illustrative example of the system of FIG. 1 that includes access pre-authorization via a web server for a mobile wireless communication device operating in a Global mode, in accordance with an illustrative example of the invention.
Figure 2B:
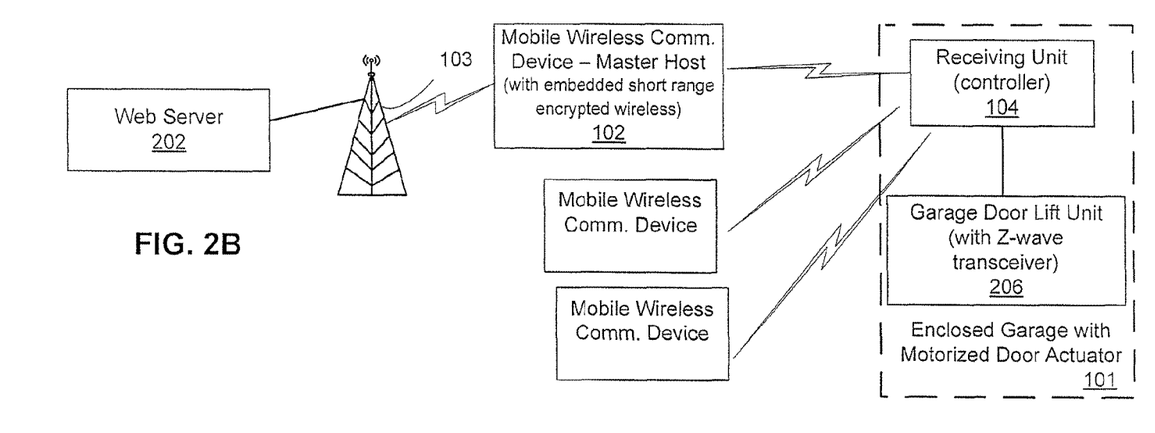
FIG. 2B illustrates a further illustrative example of the system of FIG. 2A.

The global operational mode, carried out in a network configuration of the type described herein with reference to FIGS. 2A and 2B, incorporates communications between the mobile wireless communication device 102 and a Web server 202 on the Internet to provide secure access services. Such services include configuring secure access control communications between the mobile wireless communication device 102 and the receiving unit 104 of the illustrative secure garage door actuator unit. The Web server 202 includes configurable databases supporting authentication, authorization and audit functions relating to secure access to a physical enclosure or locked device. The users and related access parameters are initially stored in the databases of the Web server 202. Thereafter, identified users of Hosts (e.g., communication device 102) access the Web server 202 to receive pre-authorization to issue a command (e.g., "open") to the receiving unit 104. To that end, the database of users for a particular controller (e.g., receiving unit 104) comprises, for each user record, the following exemplary fields: user ID, PIN/password, and operational parameters (e.g., allowed commands and associated time spans where commands are permitted). The Web server 202 also maintains an audit trail for each Controller (e.g., receiving unit 104) listing a set of access events. The audit trail includes, by way of example, the following for each access event: time stamp, requester's ID, authentication result, command pre-authorized, and result. These fields are merely illustrative and other fields and potentially stored data types for users and access events maintained by the Web server 202 are contemplated for various embodiments of the global mode of operation of the exemplary system.

In contrast, the remote operational mode relies upon local communications between the communication device 102 (operating as a "master" host device having configuration permissions) and receiving unit 104 on a short-range personal network (e.g., via encrypted Bluetooth) to configure secure access control on the system 100 illustratively depicted in FIG. 1. The remote operational mode does not utilize the Web server 202 as all communications are localized on the personal area network defined by the communication device 102 and receiving unit 104. The above-described configuration and operation database information, stored on the Web server 202 in the global mode, is stored locally on the receiving unit 104 for the remote operational mode.

As will be explained further herein below the system, including the receiving unit 104 and communication device 102, supports both global and remote operational modes. Moreover, the ability of users to exploit the global and remote operational modes is designated on a communication device-by-device and/or user-by-user basis. As a consequence, a particular configuration of a personal area network established by the receiving unit 104 and a set of mobile wireless communication devices (e.g., communication device 102) can include designating/authorizing certain devices and/or users to operate in the global mode and other devices and/or users to operate in the remote mode. Thus, in illustrative examples mobile wireless communication devices operating in one or both the global and remote operational modes are intermixed in a same personal area network (PAN).

Continuing with the overview of the illustrative examples provided in FIGS. 1, 2A and 2B, users are identified using standard definitions Host/Controller Interface terminology. A host communication stack resides in the mobile wireless communication device 102 and a controller communication stack resides in any device, such as the garage door opener receiving unit 104, intended to receive an actuator control signal from the communication device 102. As shown schematically in FIG. 1, the receiving unit 104 is signally connected via a local wire link to a garage door lift unit 106 that physically actuates a connected garage door (not shown). In the illustrative example, the local wire link is shared with a conventional pushbutton door switch 108—thus parallel signaling paths couple the receiving unit 104 and the pushbutton door switch 108 to the garage door lift unit 106. An existing remote 110 (via a wireless link to a wireless transceiver incorporated into the lift unit 106) and/or the door switch 108 operate the garage door in addition to the newly added access control functionality via the mobile wireless communication device 102 and the receiving unit 104.

In an illustrative example, the mobile wireless communication device 102 and the receiving unit 104 communicate via serial port emulation RFCOMM and use an encrypted link key for pairing. Secure Simple Pairing with numeric comparison is used between a Host operating on the communication device 102 and the Controller (receiving unit 104). In one illustrative example, the security of the pairing uses an E22 algorithm. Since the pairing method and the like are public pairing methods, the personal area network link, over which the communication device 102 (Host) and the receiving unit 104 (Controller) communicate, uses a private encryption engine in addition to available "standard" Bluetooth encryption engines.

An initialization sequence for a pairing operation typically begins after the receiving unit 104 (Controller) is installed (i.e., attached to the lift unit 106). The receiving unit 104 is pre-configured with a unique serial number during manufacturing and a unique security pass code (the link key is generated by the Bluetooth protocol and used for authorization when paired Host/Controller devices communicate with each other).

The pairing operation is further enhanced by adding one or more of the following measures described herein below. A pairing data packet includes a serial number assigned to the receiving unit 104 (Controller). The pairing data packet includes the mobile phone number of the mobile wireless communication devices 102 (Host). This additional pairing data packet information is transmitted during the pairing operation and is processed in a central processing unit of the receiving unit 104.

The pairing operation also controls the "visible" state of the receiving unit 104 (Controller). A "visible" status is characterized by the ability to pair the receiving unit 104 (Controller) with Hosts (e.g., the communications device 102). The visible status data is stored and processed by the Controller as required by the demand of the inquiry via a communication to a Host such as the mobile wireless communication device 102.

By providing encryption (e.g., as taught in the above-referenced U.S. application Ser. No. 13/162,334, which is a non-provisional of provisional U.S. Application No. 61/355, 303) along with the above information, the personal area network utilized by the communication device 102 and receiving unit 104 is enhanced against passive and active hacking. Moreover, the encryption controls access to the Controller subroutines within the receiving unit 104 for access and the like from unwanted non-authorized Hosts such as the communication device 102. The above-described approach for pairing the Host (e.g., communication device 102) with the Controller (receiving unit 104) prevents an unauthorized communication device from pairing with the Controller (receiving unit 104) and operating the lift unit 106 via the Controller (receiving unit 104).

As mentioned above the system 100 supports both Remote and Global operational modes. The Remote operational mode permits user(s) of Host devices (e.g., communication device 102) to use the Controller (receiving unit 104) via peer to peer communications between the Host (communication device 102) and the Controller (receiving unit 104) without having to utilize a web or data connection. With reference to FIGS. 2A and 2B, the global operational mode requires that the Host (communication device 102) contact the Web server 202 to obtain pre-authorization before issuing a command (e.g., "open") to the Controller (receiving unit 104).

Referring to FIG. 2B, another illustrative example of the system of FIG. 2A operating in the global mode is shown. The system operates in conjunction with a Z-WAVE home automation system coupled to the receiving unit 104. For instance, the Z-WAVE transceiver 206, electronically coupled to the receiving unit 104, makes the home automation functionality provided by the Z-WAVE system available via the user interface of the communications device 102, such as for controlling a lamp, a light switch, a thermostat, providing pool control and/or other home automation functionality via the Host device. In an illustrative example, the Z-WAVE transceiver 206 receives a signal from the receiving unit 104, which acts as a gateway for receiving a peer-to-peer Bluetooth signal from the mobile wireless communication device 102, and either opens the garage door if selected via the mobile phone/Host device user interface or operates some other remote controlled device such as a front door, for example, through the Z-WAVE home automation system.

Figure 3:
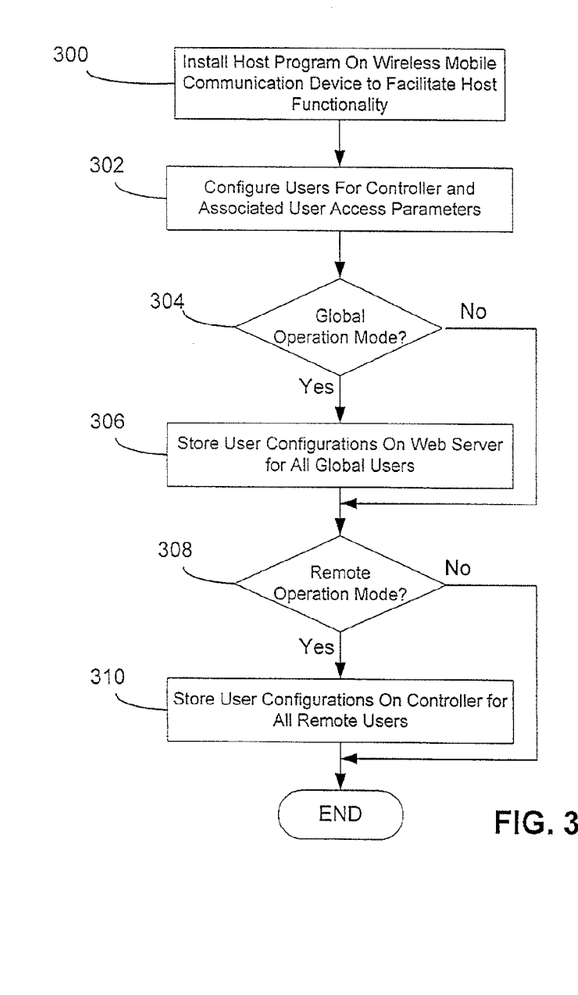
FIG. 3 is a flowchart summarizing an exemplary configuration of a system supporting both global and remote operational modes for a secure access system.

Having provided a general overview of the functionality of a system supporting both global and remote operational modes of secure access, attention is directed to a flowchart depicted in FIG. 3 summarizing a method for configuring and commencing operation of the above-described system in both global and remote operational modes. In an illustrative example, configuring and/or pairing operations on mobile wireless communication devices, such as communication device 102, requires a program module comprising computer executable instructions to be installed on the mobile wireless communication device to implement Host functionality. At least one communication device must download the program module to enable the communication device to implement master (configuration of users) functionality. Thus, during 300 the program module is stored on computer readable memory (e.g., flash, RAM, ROM, or other types of non-transitory computer readable media) of the communication device 102. The program module includes executable instructions for performing the pairing operation along with master Host functionality for setting a variety of operational parameters for the personal area network over which Hosts (e.g., configured version of mobile wireless communication device 102) and the Controller (receiving unit 104) communicate. In an illustrative example, the personal area network is limited by the Bluetooth microcomputer standard/protocol to operate with seven (7) distinctly identified entities. In an alternative illustrative example, Bluetooth control is placed in the Controller (receiving unit 104).

Moreover, it is noted that the initial pairing and activation sequence between the Controller (receiving unit 104) and a first (master) Host operating on the communication device 102, uses a hidden master pin that is provided to the user, for example via an affixed tag/sticker physically attached to the Controller (receiving unit 104). The master pin is used by the user of the master Host to perform operations that are permitted only on the Host device such as configuring additional user Hosts for the Controller (receiving unit 104) described herein below with reference to step 302.

The Controller (receiving unit 104 in FIGS. 1, 2A and 2B) is capable of simultaneously pairing with multiple Hosts (e.g., communication device 102), with each Host having an individually specified access parameter specification (e.g., access time of day, single use, etc.). Thus, during 302, the mobile wireless communication device 102 executes master Host functionality, provided by the host program installed during step 300, to present a configuration user interface for configuring a set of users (communication devices such as communication device 102) that are permitted to issue secure commands to a particular controller (e.g. receiving unit 104). Information configured by the master Host during 302 for each user includes, for example, the following: user name, phone number, (master Host) PIN, operational parameters (permissions). In addition, during 302 the master Host designates, on a user by user basis, whether the user operates in the remote and/or global operational mode. In an illustrative example, the operational parameters for a particular user include a number specifying a total number of allowed accesses (e.g., how many "open" commands can be issued to a garage door actuator). The individual user operational parameter configurations also support specifying a time period (e.g., day of week, time span within day, number of days from a start date) when a user is permitted access. It is explicitly noted that step 302 can be revisited multiple times after the first instance by the master Host to modify the set of authorized users (Hosts) and/or their associated operational parameters regarding issuing commands to a specific Controller (e.g., receiving unit 104).

With continued reference to the flowchart of FIG. 3, during 304 the master Host determines whether any global user configurations are present as a result of previous user configuration operations. If new global user configurations are present, then control passes to step 306. During 306 the master Host, operating on the communication device 102, uploads the global user configurations, for accessing the Controller (receiving unit 104), to the Web server 202 using any of a variety of transmission modes (e.g., GPRS, UTMS, EDGE, CDMA, etc.) supported by various mobile wireless service providers. Prior to uploading the global user information during step 306, the master Host performs a pairing operation with the Controller (receiving unit 104) wherein the master Host is authenticated and authorized to upload the user configurations to the Web server 202. During pairing, the master Host provides a serial number corresponding to the Controller (receiving unit 104) and a PIN assigned to the particular Controller during manufacturing. The master Host and the Controller utilize secure (e.g., encrypted Bluetooth) communications during the pairing operation. During step 306, the Web server 202 matches the configuration information uploaded from the master host (communication device 102) with the proper Controller by the serial number assigned to, and uniquely identifying, the receiving unit 104. If no global user configurations are pending, then control passes from 304 to step 308.

It is noted that the remote operational mode uses a designated Host device as a primary input device (master) for configuration user access to the Controller (receiving unit 104). Thus, with continued reference to the flowchart of FIG. 3, during 308 the master Host determines whether any remote user configurations are present as a result of previous user configuration operations that need to be downloaded to the Controller (receiving unit 104). In an illustrative example, the remote user configurations are created when the master Host user (incorporated into communication device 102) administers and adjusts the configurations for other remote users locally on the communication device 102. The master Host adds/deletes users and specifies associated operational parameters for each user.

If new remote user configurations are present, then control passes to step 310. During 310 the master Host, operating on the communication device 102, downloads the remote user configurations, for accessing the Controller (receiving unit 104), to the Controller (receiving unit 104). The modified remote user configurations are downloaded via an encrypted Bluetooth connection between the communication device 102 (running the master Host) and the Controller (receiving unit 104). Step 310 begins with the above-described pairing operation between the master Host (communication device 102) and the controller (receiving unit 104). However, in contrast to step 306, during step 310 the master Host downloads the remote user configurations to the Controller (receiving unit 104). The Controller (receiver 104) stores the user configurations on a non-transitory computer readable memory medium. Thus, no Internet access is needed during step 310. Upon completion of step 310, the transfer of global user configurations to the Web server 202 and remote user configurations to the Controller (receiving unit 104) is complete. Control passes to the END. If no remote user configurations are pending, then control passes from step 308 to the END.

It is noted that, by way of example, during setup of the master Host on the communication device 102, an option of automatically sending an SMS message to the new configured users is available. The SMS message notifies each new user to go to a web site from which the Host application can be downloaded, or alternatively secure a physical copy of the Host application to load on the mobile wireless communication device 102.

In an illustrative embodiment, information downloaded to the Controller (receiving unit 104) during step 310 facilitates automatic pairing authorization for new remote users of non-master Hosts with the Controller (receiver 104). During the download of user configuration information to the Controller (receiving unit 104) during step 310, the master Host (communication device 102) presets the controller (receiving unit 104) to allow pairing activation based on secret information provided by a previously non-paired user Host to the Controller (receiver 104) during an initial scanning when a communication device containing the new user Host is within range of the Controller (receiver 104). Pairing must still occur, but the master Host has provided, to the Controller, a data packet designed to set necessary pairing information (e.g., the new user's phone number) into the new Host when it contacts the Controller to initiate pairing.

Figure 4:
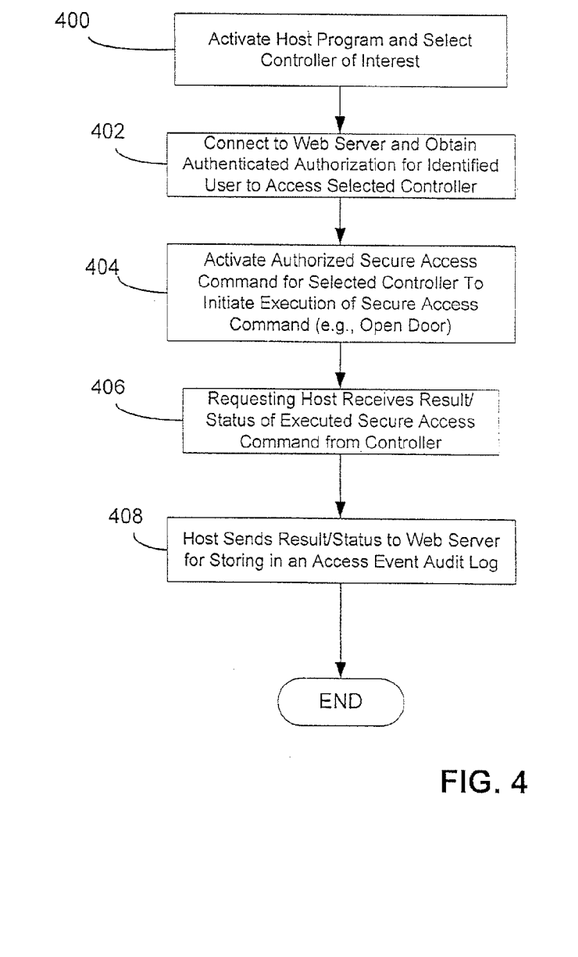
FIG. 4 is a flowchart summarizing a sequence of operations performed in accordance with an access request issued and processed in accordance with a global operational mode.

Having described configuration of the global and remote operational modes for Hosts incorporated into and executed on mobile wireless communication devices such as device 102, attention is directed to the execution of access requests by Hosts in accordance with the global operational mode (FIG. 4) and remote operational mode. Turning to FIG. 4, it is generally noted that when a Host operates in the global operational mode, the communication device 102 connects to the Web server 202 to receive authorization for each access request submitted by the Host (communication device 102) to the Controller (receiving unit 104). Thus, each access request by the Host (communication device 102) is treated by the system as a unique event that is tracked and saved in an audit log maintained on the Web server 202. In the illustrative example, during step 400, the user of the communications device 102 activates (opens) the program module (e.g., application program) embodying the Host functionality described herein, and the user selects the Controller of interest. In this example, the receiving unit 104 is selected via a user interface provided by the Host interface displayed on the communications device 102.

Next, during step 402 the Host (communication device 102) connects to the Web server 202 to obtain authenticated authorization to access the selected Controller (receiving unit 104)—i.e., issue a command to be carried out by the receiving unit 104 to issue a signal to an access control actuator. The request from the Host to the Web server includes, for example, the following: user identification, authentication information (e.g., PIN), Controller identification, and type of request (e.g., open door). If the request (e.g., open door) from the Host to the Web server 202 is within the limitations (e.g., time of day, type of action requested) specified in the operational parameters given to the identified user, the Web server 202 sends an authorization data packet to the requesting user's communication device 102. The Host executing on the communication device 102 then sees that it has been authorized by the server 202.

During step 404, the Host operating on the communication device 102 sends the authorized request to the Controller (receiving unit 104) to carry out the authorized secure access command by sending an appropriate control signal to a physical actuator for providing secure access (e.g., garage door opener, an electro-mechanical doorway lock and/or opener mechanism, a safe lock, including a gun safe lock, a lock box lock, a cabinet door lock, including a gun cabinet door lock, a security gate and/or entry barrier, or another access control device that is being activated by the receiving unit 104).

During step 406, the Controller (receiving unit 104) issues a condition (result/status) message to the Host on the communication device 102. Thereafter, during step 408, the Host sends the result/status information contained in the condition message to the web server 202. The web server 202 records information pertaining to each separate user (Host) authorization request and result/status conditions that followed submission of an authorized request. Conditions that are generated include, but are not limited to, the actual physical position of the access control device that received a command from the Controller as a result of the authorized request being received by the Controller. Such positions include the following: Open/Closed access device position, jammed access device status, improper access attempt indicator, etc. In the illustrative example, all of the above data packets are encrypted using a private encryption engine as described in U.S. application Ser. No. 13/162,334 filed on Jun. 16, 2011, which is a non-provisional of provisional U.S. Application No. 61/355,303 filed Jun. 16, 2010. The described encryption prevents hacking the secure codes needed to access by sniffing (blue jacking) the signals either passively or actively. Alternatively, the encryption can be combined with an E0 stream cipher if required.

The remote operational mode for issuing access commands from the Host operating on communication device 102 is performed without accessing the Web server 202. Rather, the user of the communications device 102 activates (opens) the program module (e.g., application program) embodying the Host functionality described herein. The user may, depending on the level of security of the system, initially be required to enter a password to receive access to controller devices configured on the Host executing on the communications device 102. The user selects the Controller (receiving unit 104) of interest and then activates a command (e.g. open) on the selected Controller. Encrypted Bluetooth is used to provide a secure communications link between the communications device 102 and the receiving unit 104. In this example, the receiving unit 104 is selected via a user interface provided by a Host graphical user interface displayed on the communications device 102.

In one illustrative example, the system includes a position switch sensor, such as a magnet and a magnetic switch sensor, installed at the door or other secure access device. The position switch sensor is in communication with the Controller 104 so as to provide the Controller 104 with the open/closed status of the associated secure access device. The Host (e.g., communication device 102) communicates with the Controller (receiver 104) to poll the Controller (receiver 104) for the open/closed status of the associated secure access device and display the open/closed status via the Host device's user interface. In the case of the above illustrative garage door control example, the Host (communication device 102) user is able to remotely ascertain whether the garage door is currently open or closed. In an illustrative example, the user is further able to send an open/close command via the Host device to change the status of the secure access device.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Illustrative examples of this invention are described herein, including the best mode known to the inventors for carrying out the invention. Variations of those preferred illustrative examples may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A system for controlling physical access comprising:
 a central security server;
 a mobile wireless communication device supporting a plurality of wireless communication technologies including:
  mobile wireless, and
  short-range wireless;
 an electro-mechanical access control security device;
 a receiving unit controlling the electro-mechanical access control security device, wherein the receiving unit is adapted to be paired with a host on the mobile wireless communication device, and wherein the receiving unit is adapted for receiving user commands from the paired host for activating the electro-mechanical access control security device via a plurality of wireless control operational modes of the system, wherein the operational modes of the system include:
a remote mode, based upon a remote user access definition stored on the receiving unit, solely using a peer-to-peer communication directly between the receiving unit and the mobile wireless communication device via the short-range wireless communication technology; and a global mode, based upon global user configurations stored on the central security server, using a pre-authorization, obtained by the host on the mobile wireless communication device from the central security server via the mobile wireless technology, for a user command issued from the mobile wireless communication device to the receiving unit via the short-range wireless communication technology, wherein the receiving unit is communicatively interposed between the mobile wireless communication device and the electro-mechanical access control security device, wherein the remote user access definition specifies a set of authorized users of the receiving unit and scope of permitted access to a command set of the receiving unit by the authorized users on an individual user basis, wherein the central security server is adapted to upload, during a global mode configuration operation with a master host on a master-host configured mobile wireless communication device, a global configuration information for a set of hosts, the global configuration information being used by the central security server to provide the pre-authorization to the host on the mobile wireless communication device for the user command issued from the mobile wireless communication device to the receiving unit, and wherein the master host executing on the master-host configured mobile wireless communication device provides to the central security server, during the global mode configuration operation, an authentication information arising from a pairing operation of the master-host configured mobile wireless communication device with the receiving unit controlling the electro-mechanical access control security device.

2. The system of claim 1 wherein the host and receiving unit are adapted to carry out an initializing pairing operation using encrypted peer-to-peer communications.

3. The system of claim 2 wherein the peer-to-peer communications utilize Bluetooth short-range wireless communications technology.

4. The system of claim 1 wherein individual ones of a set of hosts are configured to operate in the remote and/or global mode on an individualized host-by-host basis.

5. The system of claim 1 wherein the mobile wireless technology is a cellular wireless technology.

6. The system of claim 5 wherein the mobile wireless device is a cellular phone adapted to execute application programs.

7. The system of claim 5 wherein the mobile wireless devices is a tablet computer.

8. The system of claim 1 wherein the receiving unit is signally connected via a hardwired connection to the electro-mechanical access control security device.

9. The system of claim 1 wherein the electro-mechanical access control security device comprises a first radio signal interface for receiving direct remote control radio commands, and wherein the receiving unit receives user commands from the host via a second radio signal interface.

10. The system of claim 1 wherein the preauthorization is a single time permission to use a particular identified command.

11. The system of claim 1 wherein the central security server maintains an audit trail of each global mode access request.

12. The system of claim 11 wherein the audit trail includes a result of each global mode access request.

13. The system of claim 1 wherein the preauthorization request from the host to the server includes: a user identification, authentication information, receiving unit identification, and access request type.

14. The system of claim 8 wherein the hardwired connection terminates at an electrical signal terminal of the electro-mechanical access control security device configured to receive a control signal from a physical control switch.

15. The system of claim 14 wherein the electro-mechanical access control security device is a door lift unit, and wherein the physical control switch is a push button control for activating an actuation cycle of the door lift unit.

* * * * *